United States Patent [19]

Henderson

[11] 4,301,644
[45] Nov. 24, 1981

[54] ATTACHMENT FOR COMBINE HARVESTER

[76] Inventor: Grant I. Henderson, Rte. 1, Box 74, Summerville, Oreg. 97876

[21] Appl. No.: 159,940

[22] Filed: Jun. 16, 1980

[51] Int. Cl.³ ..................... A01D 14/02; A01D 45/02
[52] U.S. Cl. ..................................... 56/14.3; 56/119; 56/17.3
[58] Field of Search ..................... 56/14.3, 14.4, 17.3, 56/DIG. 9, 119

[56] References Cited

U.S. PATENT DOCUMENTS

| | | | |
|---|---|---|---|
| 2,924,056 | 2/1960 | Morgan et al. | 56/119 |
| 3,415,044 | 12/1968 | Munson | 56/119 |
| 3,423,910 | 1/1969 | Shimamoto et al. | 56/119 |
| 3,531,921 | 10/1970 | Hiyamuda | 56/14.3 |
| 3,785,130 | 1/1974 | Gaeddert | 56/DIG. 9 |
| 4,204,385 | 5/1980 | Taylor | 56/119 |

Primary Examiner—Robert A. Hafer
Attorney, Agent, or Firm—Klarquist, Sparkman, Campbell, Leigh, Whinston & Dellett

[57] ABSTRACT

An attachment for a combine harvester includes a plurality of narrow housings disposed forwardly of the sickle bar of the harvester. Within each housing an endless belt carries a multiplicity of flexible tines which, for a given course of the belt, extend laterally across a grain receiving channel between housings. The tines protrude through slots in the housings for the course of the belt moving toward the harvesting machine, but are folded within the housings on the return course.

21 Claims, 9 Drawing Figures

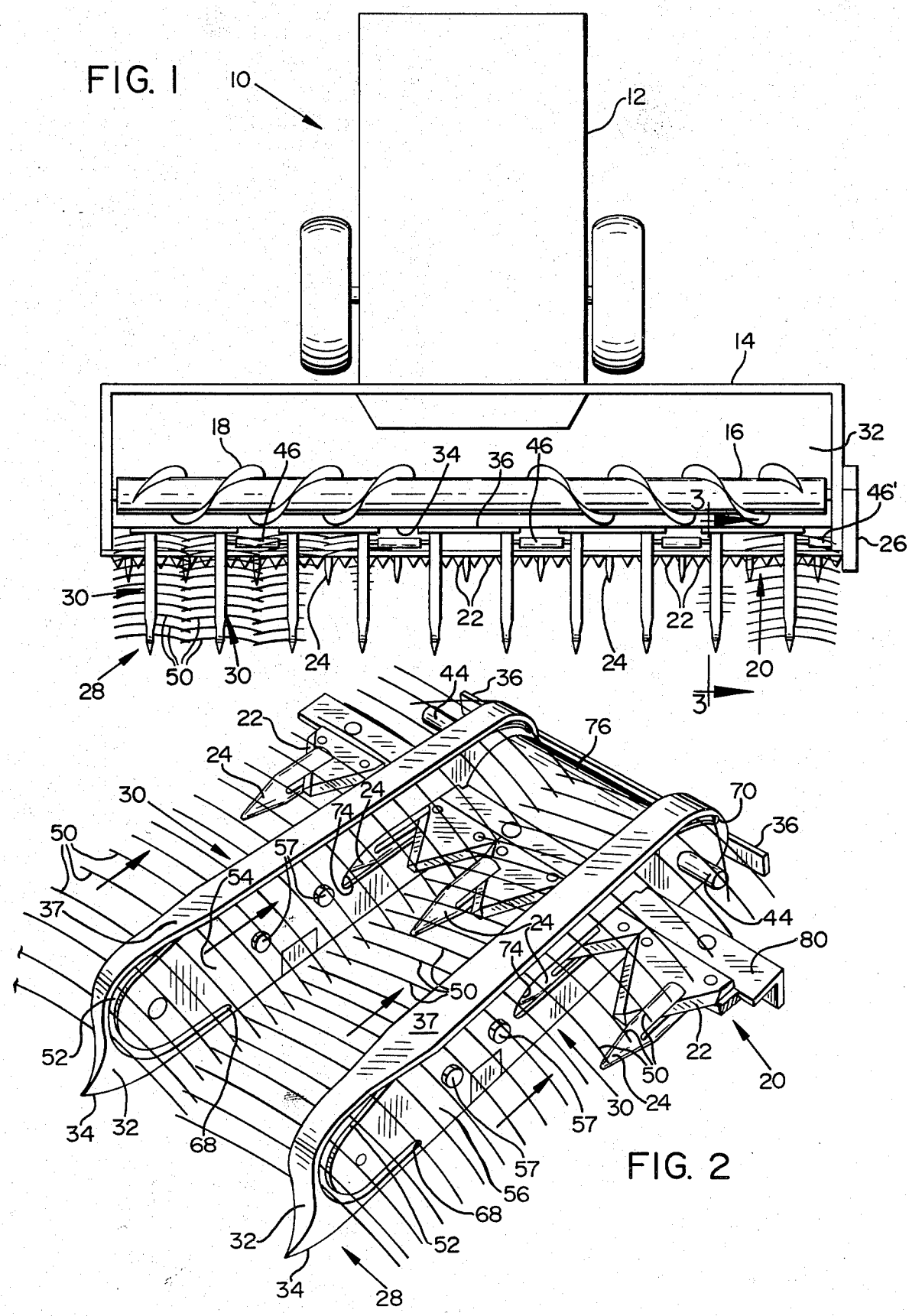

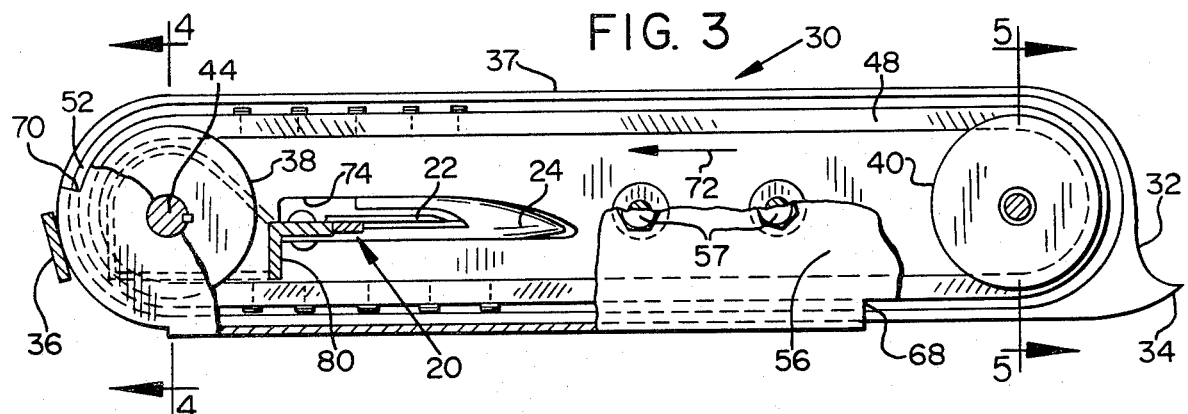
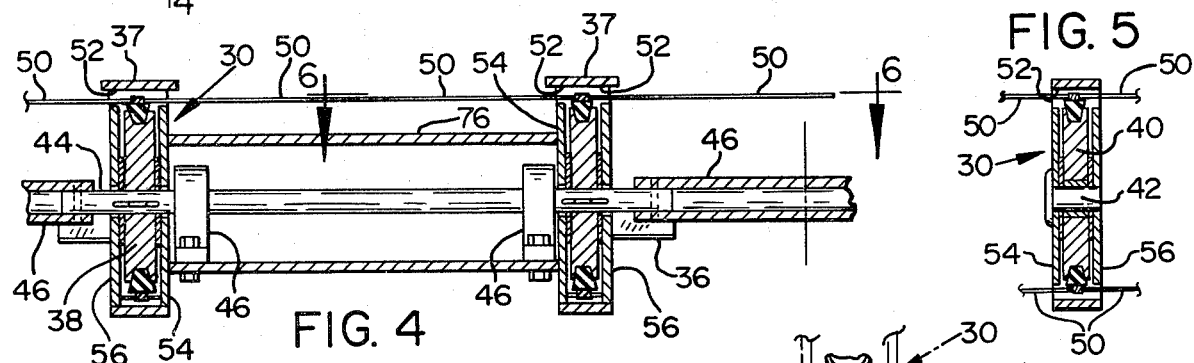
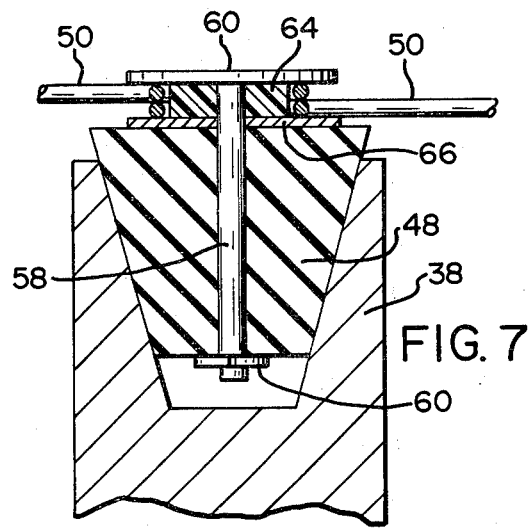
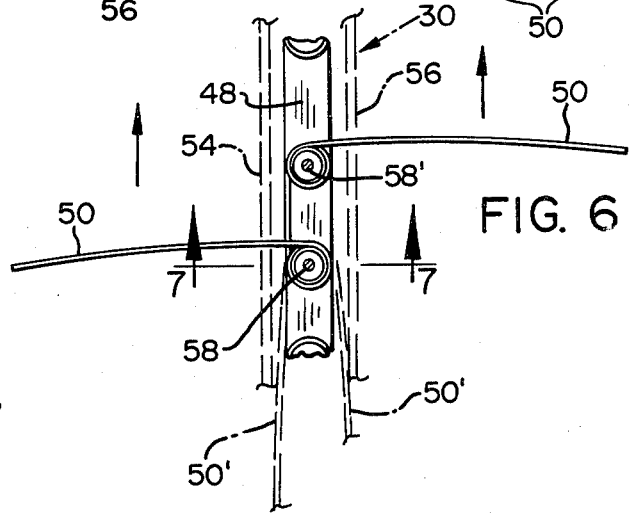
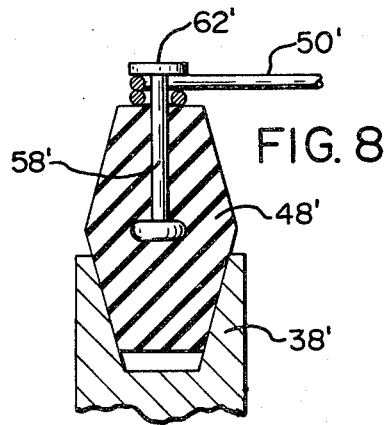
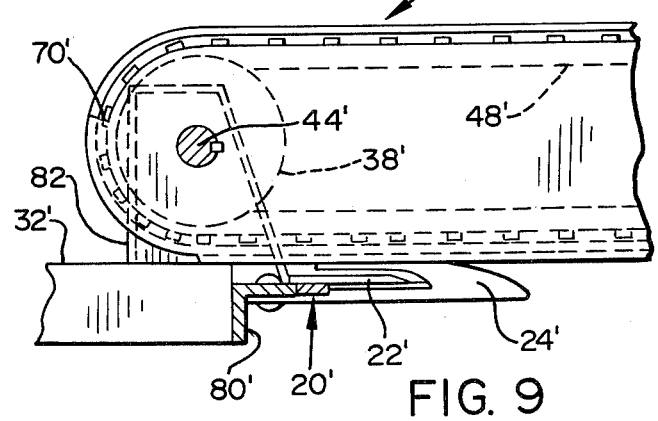

ATTACHMENT FOR COMBINE HARVESTER

BACKGROUND OF THE INVENTION

The present invention relates to an attachment for a grain harvesting machine and particularly to such an attachment for harvesting grain in a more efficient and less wasteful manner.

A conventional combine harvester includes a rotating reel having a plurality of circumferentially positioned arms or bats which urge the grain being cut toward the machine sickle bar. While this type of apparatus has been found acceptable in many respects over the years, nevertheless a great deal of wastage occurs due to the somewhat violent action of the bats with respect to the grain. Grain heads are often shattered or broken off and never reach the actual harvesting apparatus, or grain may be bent to the ground below the sickle bar. In the case of some crops such as soybeans, as much as one-third thereof may be lost in the field merely because it is not efficiently fed into the harvesting apparatus.

SUMMARY OF THE INVENTION

In accordance with the present invention, a a plurality of grain engaging means are provided for delivering grain toward the harvester sickle bar during forward travel, said grain engaging means comprising elongated forward members extending adjacent one another in substantially perpendicular relation to the harvesting machine and defining wide grain receiving channels therebetween. A multiplicity of flexible tines protrude from sides of the aforementioned forward members, across the grain receiving channels, with at least ones of said tines reaching approximately as far as the ends of tines extending from the adjacent forward member. Drive means are disposed within the forward members for moving the tines in a direction toward the harvesting machine. In a preferred embodiment, the drive means comprise conveyor belts positioned adjacent a slot in each forward member for the course of the belt moving toward the harvesting machine, while the tines fold within such member for the return course. The forward members are disposed in substantially parallel relation to the ground over which the harvesting machine travels, whereby the tines are also generally in parallel or equi-distant relation with the ground and in supporting relation to the grain as the tines move toward the sickle bar and urge the grain thereagainst. The extreme loss heretofore occasioned by the use of a conventional reel is avoided.

It is accordingly an object of the present invention to provide an improved grain harvesting machine which operates more efficiently without the loss of grain heretofore encountered.

It is a further object of the present invention to provide an improved attachment for a grain harvesting machine for moving grain in a supporting manner toward harvesting machine knife elements without forcefully contacting the grain in such a way as to damage the same.

It is another object of the present invention to provide an improved attachment for a combine harvester which enables the harvester to operate more efficiently and with less waste.

The subject matter which I regard as my invention is particularly pointed out and distinctly claimed in the concluding portion of this specification. The invention, however, both as to organization and method of operation, together with further advantages and objects thereof, may best be understood by reference to the following description taken in connection with the acompanying drawings wherein like reference characters refer to like elements.

DRAWINGS

FIG. 1 is a plan view of a combine harvester equipped with the attachment according to the present invention;

FIG. 2 is a perspective view of one section of the aforementioned attachment;

FIG. 3 is a cross-sectional view, partially broken away, as taken at 3—3 in FIG. 1;

FIG. 4 is a cross-sectional view, partially broken away, taken at 4—4 in FIG. 3;

FIG. 5 is a cross-sectional view taken at 5—5 in FIG. 3;

FIG. 6 is a cross-sectional view taken at 6—6 in FIG. 4;

FIG. 7 is a cross-sectional view of a conveyor belt used in the attachment according to the present invention;

FIG. 8 is a cross-sectional view of an alternative conveyor belt used in the attachment according to the present invention; and FIG. 9 is a side view, partially broken away, of an attachment according to an alternative embodiment of the present invention.

DETAILED DESCRIPTION

Referring to the drawings and particularly to FIG. 1, a combine harvester 10 includes a self propelled chassis 12 containing grain separating mechanism and a forwardly mounted header 14 which includes an auger or screw conveyor 16 provided with fins 18 designed to move cut grain centrally of the header toward chassis 12. A sickle bar 20 is mounted forwardly on the header and is provided with a plurality of forwardly extending triangular knives 22 which move in a horizontal direction relative to apertures in forwardly extending fingers 24 supported by angle 80 and also carrying knives. Drive mechanism 26 reciprocates the sickle bar in a transverse direction whereby to oscillate the triangular knives 22 and cut the grain.

According to the present invention, a plurality of grain engaging means 28 are attached to the forward portion of the header for urging grain toward the triangular knife elements. The grain engaging means include forward members or housings 30 disposed in substantially perpendicular relation to the forwardly moving harvester and in adjacent relation to one another. The forward edge of pan 32 may be upwardly stepped at 34 with the housings, in pairs, being secured thereagainst employing bars 36 welded or otherwise secured to the pan. The undersides of the housings are supported for a short distance by the pan lip, but the majority of the housing length extends forwardly of the combine harvesting machine in substantially parallel relation to the ground for reaching the field crop.

A pair of housings 30 is illustrated in greater detail in FIG. 2. The housings are elongated in the direction of travel and materially narrower in their lateral dimension, crossways of the direction of travel, than the spacing therebetween to provide or define wide grain receiving channels therebetween for passing grain toward the oscillating knife elements. The narrower width of the housings does not interfere with or impede the passage of grain. Crops such as wheat and rye are typically harvested employing apparatus according to the present invention. Housings 30 are generally straight and flat, having substantially vertical, straight flat sides 54 and 56, held in spaced relation by bolts 57, and forward edges 32 which are tapered downwardly to uptilted divider points 34. The forward edge 32 is also somewhat narrower than the upper edge or top 37 of each housing which is slightly widened a short distance rearward of the forward edge of each housing to provide a protective cover plate.

Referring particularly to FIG. 3, each housing 30 is provided therewithin with a rearwardly located rotating member or pulley 38 proximate the rear end of the housing, and a forward rotating member or pulley 40 disposed farther from the harvesting machine and suitably proximate the forward end of the housing. Each of the rotating members or pulleys is rotatable about a horizontal axis approximately parallel to the forward position of the pan or header. Forward pulley 40 is rotatable about a pin 42 extending between sides of the housing as illustrated in FIG. 5, while rearward pulley 38 is keyed to a drive shaft 44 journaled in bearings 46, said drive shaft being common to a pair of housings as can be seen in FIGS. 2 and 4. Tubular couplings 46 join shaft 44 associated with a pair of housings to a corresponding shaft of adjacent pairs of housings, with the end coupling 46' being driven via drive mechanism 26 at a predetermined speed.

An endless conveyor or drive means in the form of a V-belt 48 is entrained around pulleys 38 and 40 and carries a multiplicity of flexible steel wire tines 50 which, in the case of upper course or run of the belt, extend laterally through slots 52 defined between the housing top 37 and housing sides 54 and 56. The tines 50 extend outwardly in substantially perpendicular relation to the belt and the housing over the run of the belt that moves toward the harvesting machine. The belt moves the tines in a rearward direction toward the sickle bar as the harvester machine travels forwardly, with the speed of shafts 44 being predetermined so that the tines move rearwardly at approximately the same speed as the forward movement of the machine. The belt moves the tines along a path in approximately parallel relation or equi-distant relation to the ground for engaging and supporting the grain and does not move the tines unnecessarily with respect to the grain, inasmuch as the housings and the slots 52 along the top edges thereof are disposed in substantially parallel relation to the ground. The tines also extend across the grain receiving channel between housings at least approximately as far as the ends of tines extending from the adjacent housing, and preferably in overlapping relation. Therefore, the grain in the channel between the housings is delivered by the tines towards the knife elements of the sickle bar during the forward travel of the harvesting machine as the tines interleave and support the grain in upright position.

The tines are anchored to the belt 48 by means of pin fasteners 58 extending radially through the belt 48 as illustrated in FIG. 7, with a snap ring 60 securing the pin at the underside of the belt 48. The top of the pin 58 is provided with an enlarged head 60 separated from the belt with a spacer 64 around which the tine 50 is wrapped, and a washer 66 separating the tine from the belt. An alternative construction employing a double V-belt 48' is illustrated in FIG. 8 wherein pin 58' is anchored centrally of the belt and is provided with an enlarged head 62' for holding the tine 50'. Each slot 52 extends adjacent the upper course of the belt and terminates around the forward end of the housing adjacent the bottom run or course of the belt at a point 68 which is rearward of the forward end of the housing by about the length of one of the tines. The housing is then closed along the lower or return course or run of the belt to a point 70 around the rear end of the housing and just below the top course or run. As the belt moves in the direction indicated by arrow 72 (in FIG. 3) the tines will bend or fold inwardly within the sides of the housing at point 70 before the tines start moving forwardly of the housing, and then reappear at point 68 where the tine ends move outwardly as their anchored end is near the forward part of the housing. The inside walls of sides 54 and 56 are desirably coated with urethane along the lower course or run of the belt whereby to prevent undue friction as the tines are folded inwardly to the positions indicated at 50' in FIG. 6. Tines 50 are suitably medium gauge spring steel wire.

It will be observed the tines are wound around pins 58 in such a way that the folding back of the tines within the housing tends to wind the tines tighter onto the pins. A pair of adjacent tines 50 as extend from either side of a housing 30 are seen to comprise a single wire wound around a pin 58 and an adjacent pin 58', rearward thereof, in bracing relation. The manner of winding is further illustrated for the respective pins 58 and 58' in cross section in FIGS. 7 and 8, although it will be understood that the same kind of V-belt cross section would be seen at both locations.

As illustrated in FIGS. 2 and 3, the sickle bar 20 in the preferred embodiment is positioned through apertures 74 in the sides of the housing, approximately midway between the upper and lower course of belt 48. Thus, the belt 48 extends around the knife elements with the upper course of the belt being above the knife elements and the lower course below the knife elements. Pairs of adjacent housings are constructed as a unit as illustrated in FIG. 2 and a cover 76 just rearward of the sickle bar assembly joins a pair of housings in covering relation to bearings 46 which are also supported thereby. A covering 76 may be joined to the angle 80 along which the sickle bar moves and can also be supported from bar 36 secured to the pan.

The embodiment of FIGS. 2 and 3 is preferred inasmuch as there is a closer relation between the moving tines and the knife elements 22. Also, there is not much vertical distance from the knife elements over the top of covering 76 to the pan for gathering grain. However, the sickle bar in this embodiment must be disposed through slots 74 in the housings, and the header adapted to mount the sickle bar above the bottom edge of the pan lip. An alternative embodiment as illustrated in FIG. 9 can be somewhat more easily utilized on a conventional combine. Corresponding elements, referred to with primed reference numerals in FIG. 9, are substantially similar to elements of the previous embodiment. Each housing 30' is mounted upon pan 32' employing brackets 82, while angle 80' carrying the sickle bar 20' is mounted at the forward edge of the pan lip. In the embodiment of FIG. 9 it will be noted both the upper and lower course of the belt 48' are above the sickle bar. While this configuration is somewhat easier to install, it requires the grain to fall over the top rear of the housing at a greater distance from the knife elements. The FIG. 9 embodiment does retain other advantages of the invention in providing wide grain receiving channels between housings wherein the grain is smoothly urged by flexible wire tines toward the sickle bar.

The housings 30 or 30' are suitably between fifteen inches and four feet in length, having a height between about four inches and one foot, and a thickness, near their forward ends, of about one inch. The spacing between adjacent housings is suitably between nine inches and two feet, with the tines from adjacent housings extending more than halfway across the grain receiving channel. The tines may be spaced from four inches to one foot along each belt 48. In general, the housings 30' of the FIG. 9 embodiment were somewhat smaller in size and length than the housings in the first described embodiment since they are typically mounted more closely to the forward edge or lip of the pan. It is understood the dimensions given are by way of example only and the present invention is not restricted to some particular dimensional size.

In any case, it will be seen that the channels between housings are substantially wider, i.e. at least about eight times wider, than the housings, such that the housings slide through and feed the grain without substantial interference with the cutting thereof. The apparatus according to the present invention is of particular advantage in the case of non-row type crops. The flexible wire tines support the grain and move grain smoothly and gently into the sickle bar in an efficient manner without shattering grain heads or causing other problems or waste characteristic of conventional combine harvesters.

While I have shown and described plural embodiments of my invention, it will be apparent to those skilled in the art that many changes and modifications may be made without departing from my invention in its broader aspects. I therefore intend the appended claims to cover all such changes and modifications as fall within the true spirit and scope of my invention.

I claim:

1. In a grain harvesting machine,
a substantially horizontal and forwardly moving grain receiving pan and a plurality of oscillating knife elements extending along a forward edge of said grain receiving pan for cutting grain for reception in said pan,
a plurality of grain engaging means for delivering the grain toward said knife elements during forward travel of said harvesting machine, said grain engaging means comprising forward members extending adjacent one another in substantially perpendicular relation to the forwardly moving pan of said harvesting machine, said members defining grain receiving channels therebetween, and a multiplicity of flexible tines extending from sides of said members across said grain receiving channels with at least ones of said tines reaching at least approximately as far as the ends of tines extending from the adjacent member for contacting the grain,
and drive means for moving said tines in a direction toward said forwardly moving pan of said harvesting machine at approximately the same speed as the forward movement of the harvesting machine.

2. The apparatus according to claim 1 wherein said forward members are supported from said harvesting machine in approximately parallel relation to the ground.

3. The apparatus according to claim 1 wherein said drive means moves said tines along a path toward said harvesting machine wherein said tines along said path are approximately equi-distant from the ground and at least approximately the same level as said knife elements.

4. The apparatus according to claim 1 wherein said forward members are substantially narrower in lateral dimension, crossways of the direction of travel of said harvesting machine, than the grain receiving channels therebetween.

5. The apparatus according to claim 4 wherein a said forward members comprise housings narrow in the lateral direction and provided with slots through which said tines extend, said drive means comprising a conveyor within said housing having said tines fastened thereto.

6. The apparatus according to claim 5 wherein said housing is provided with a pair of horizontally spaced rotating members having horizontal rotational axes approximately parallel to the forwardly moving portion of the harvesting machine and about which said conveyor is entrained, one of said rotating members being farther from the forwardly moving portion of said harvesting machine than the other.

7. The apparatus according to claim 6 wherein said conveyor defines upper and lower courses between said rotating members, said slot being adjacent one of said courses for passing tines moving toward said pan of said harvesting machine, said flexible tines bending within said housing for the remaining course.

8. The apparatus according to claim 5 wherein said conveyor comprises a belt, including pin fasteners extending through said belt with said flexible tines being wound around said pin fasteners.

9. The apparatus according to claim 8 including a pair of fasteners for supporting a tine, wherein said tine is wound around both said fasteners and extends from both sides of said belt.

10. The apparatus according to claim 4 wherein said drive means comprises an endless conveyor having said tines fastened thereto, said conveyor having an upper course running toward said harvesting machine and a lower course running away from said harvesting machine, and means to fold back said tines during said lower course.

11. The apparatus according to claim 10 wherein said conveyor extends around said oscillating knife elements with the upper course of the conveyor being above the oscillating knife elements and the lower course of the conveyor being below the oscillating knife elements.

12. The apparatus according to claim 10 wherein all of said conveyor extends above said oscillating knife elements.

13. The apparatus according to claim 3 wherein said drive means moves said tines substantially immediately over said knife elements.

14. In a grain harvesting machine including a plurality of movable knife elements extending along a forwardly moving horizontal header portion of said harvesting machine for cutting grain for reception by said header portion, an attachment comprising:
grain engaging means for urging grain toward said knife elements during forward travel of said harvesting machine, said grain engaging means comprising a pair of members extending forwardly of said harvesting machine, each forwardly extending member being elongated forwardly of said harvesting machine and each being substantially narrower in lateral dimension than the spacing therebetween to define therebetween a wide grain receiving channel for passing grain toward said knife elements without substantially impeding said passage of grain because of said narrow forwardly extending members, movable tines extending laterally from said members, and means for moving said tines rearwardly along said members along a substantially horizontal path at approximately the same level as said knife elements and toward said knife elements during forward travel of said harvesting machine.

15. The apparatus according to claim 14 wherein said forwardly extending members are substantially straight and flat, having a narrow horizontal edge.

16. The apparatus according to claim 15 wherein a said forwardly extending member comprises a housing with substantially vertical straight flat sides provided with slots through which said tines protrude.

17. The apparatus according to claim 16 wherein said means for moving said tines comprises a belt to which said tines are anchored, and forward and rearward pulleys having horizontal axis within said housing around which said belt is entrained.

18. The apparatus according to claim 17 wherein said slots in said sides extend along said belt in the course thereof which moves said tines toward said knife elements, said sides being substantially closed along the opposite course, and said tines being flexible for folding within the housing along the opposite course.

19. The apparatus according to claim 17 wherein said belt extends around said knife elements.

20. The apparatus according to claim 13 including means for providing a return course for said tines along said members in a direction away from said knife elements, and means for folding back said tines during said return course.

21. The apparatus according to claim 14 wherein said means for moving said tines moves the same substantially immediately over said knife elements.

* * * * *